Sept. 22, 1931.   E. J. VON PEIN ET AL   1,824,247
CASH REGISTER
Filed June 14, 1922   10 Sheets-Sheet 8
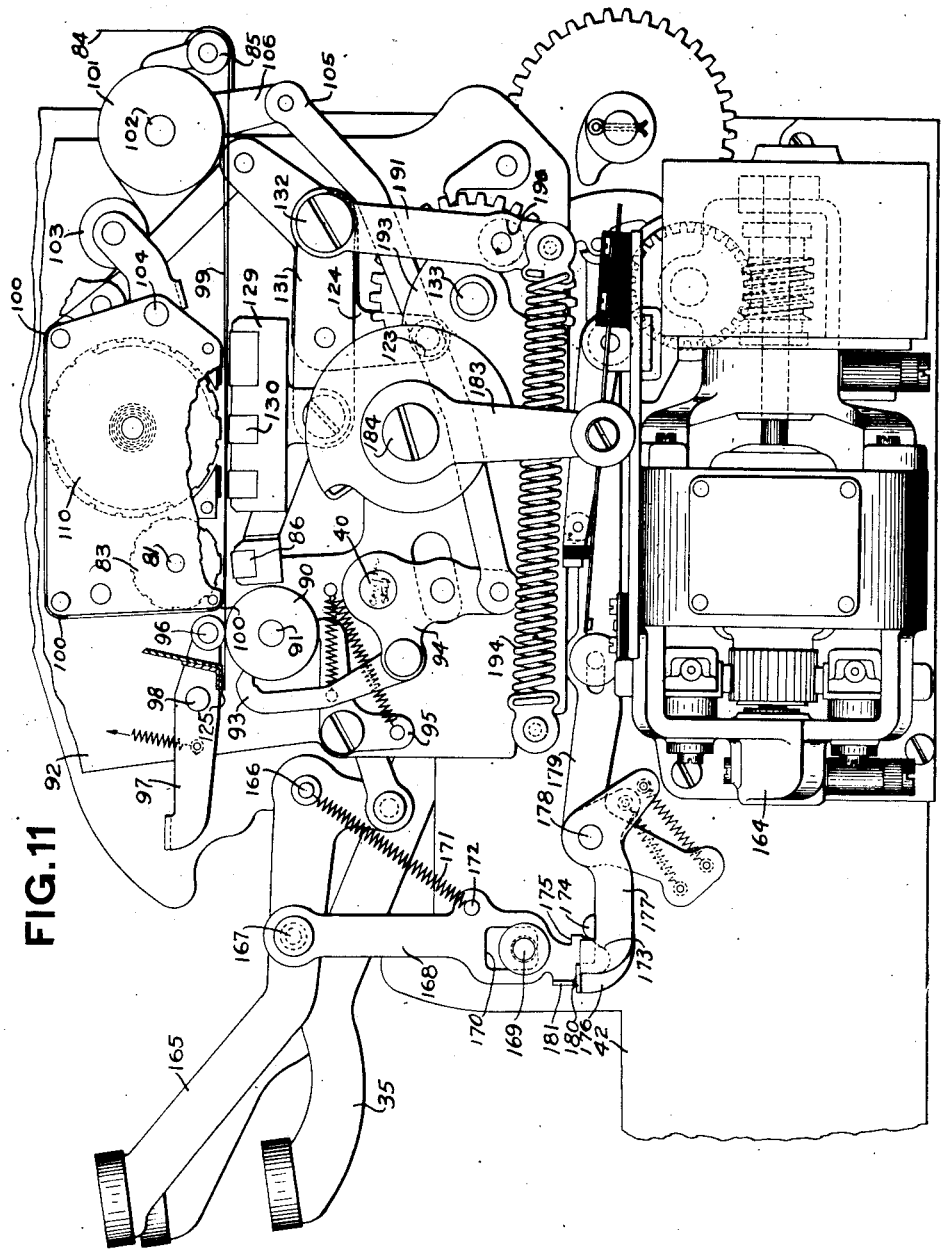

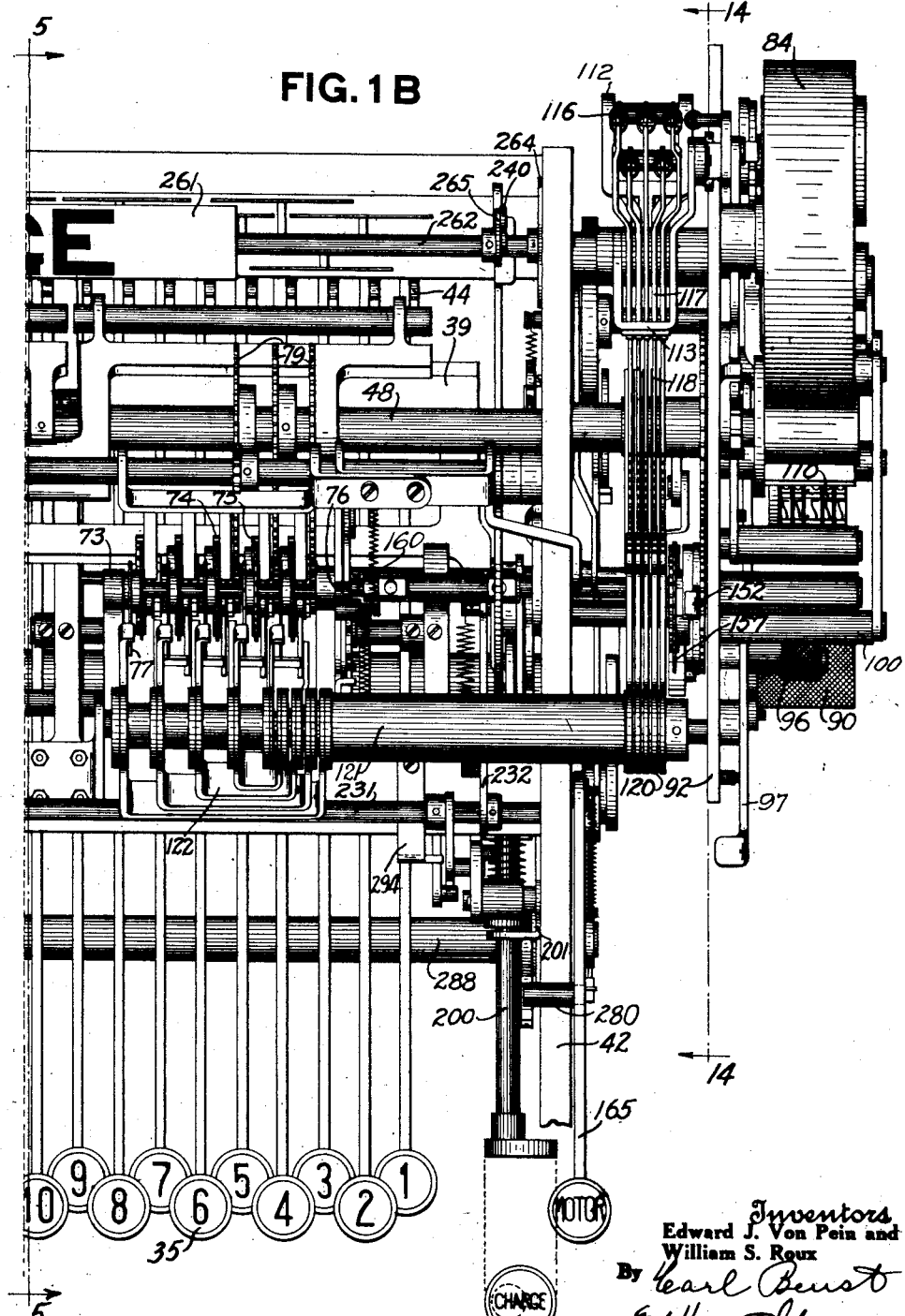

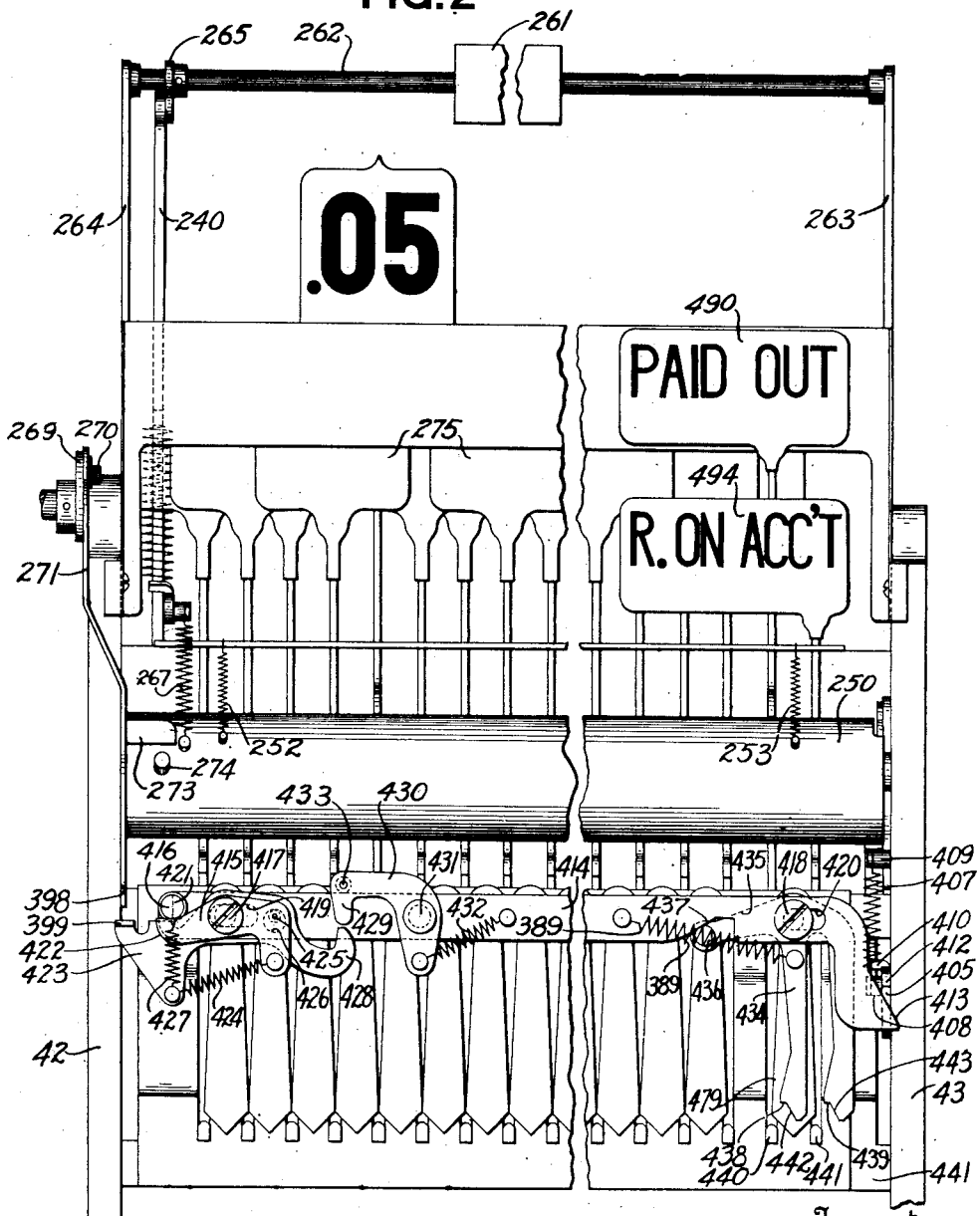

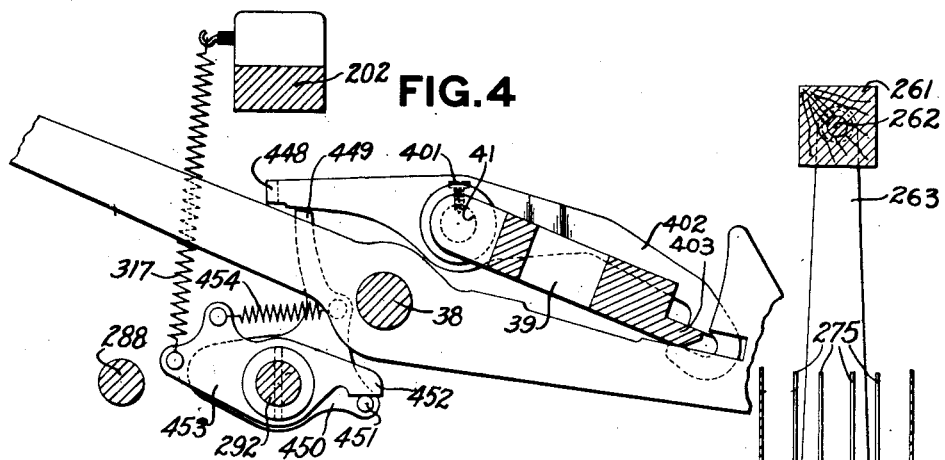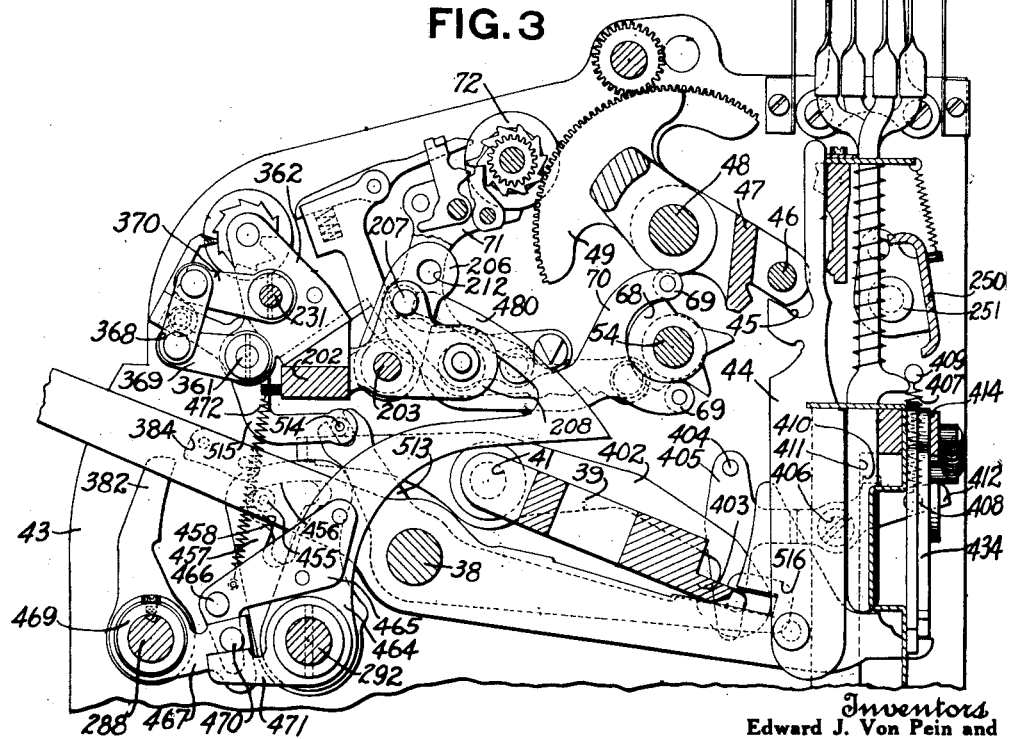

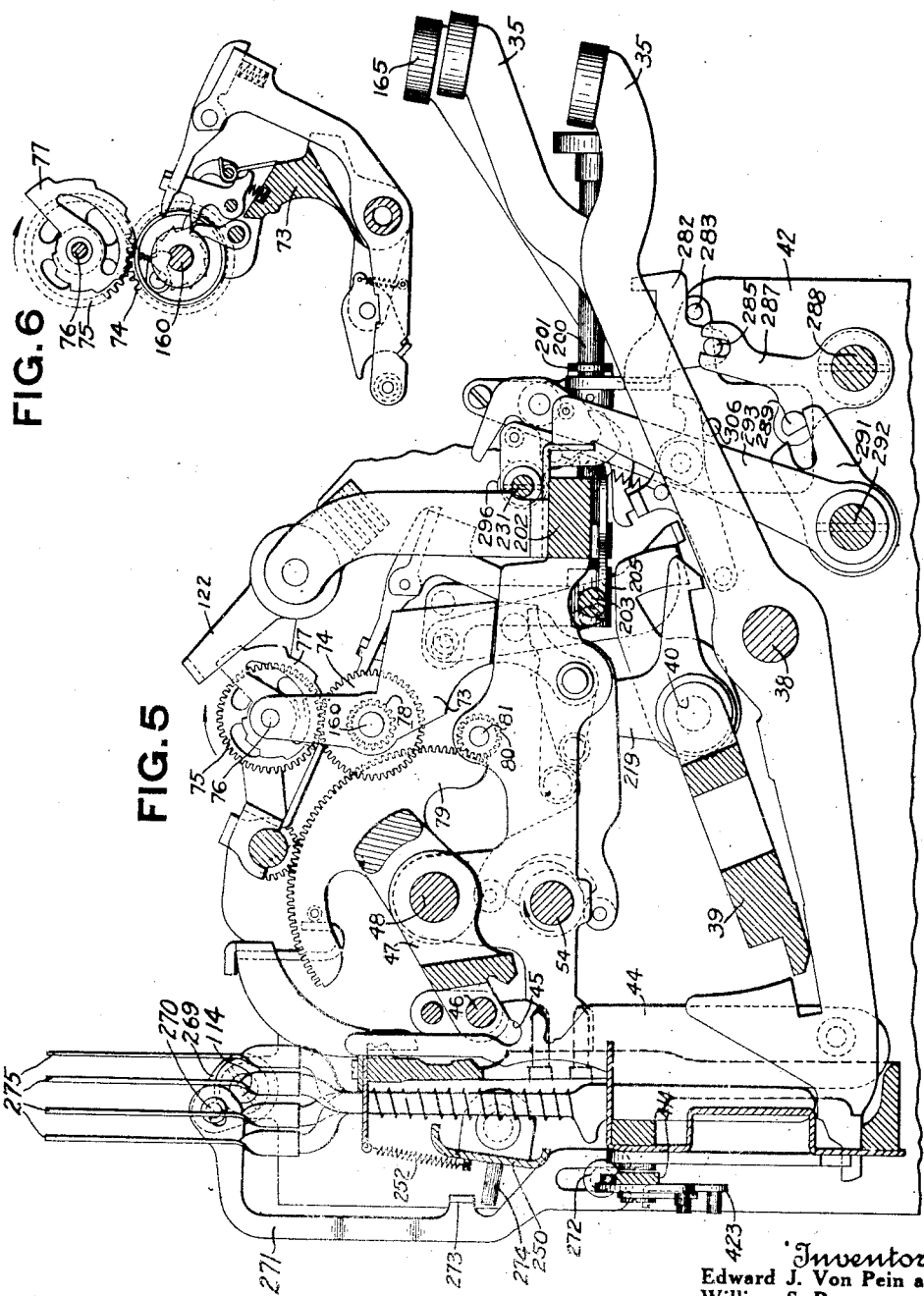

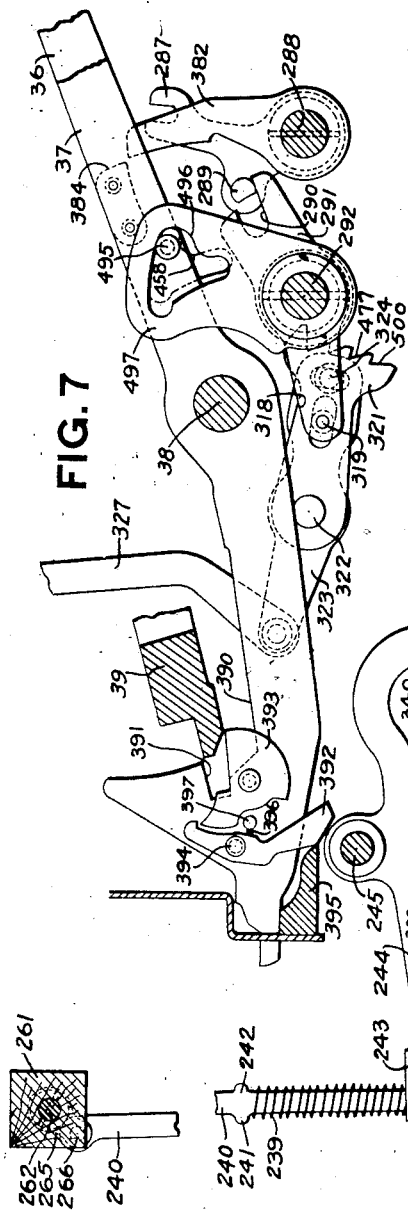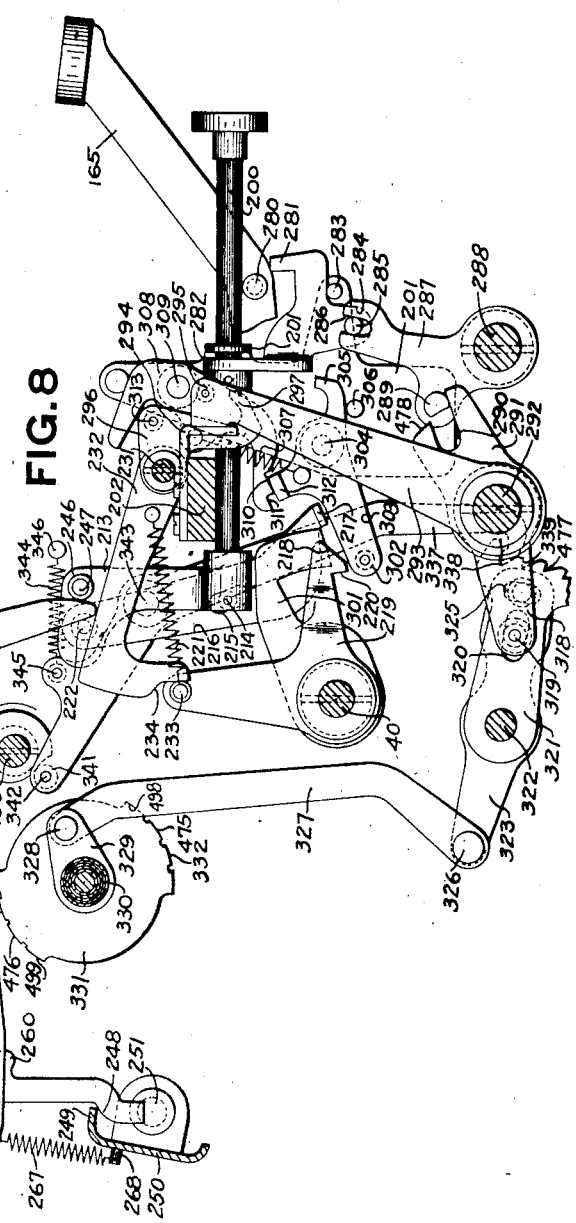

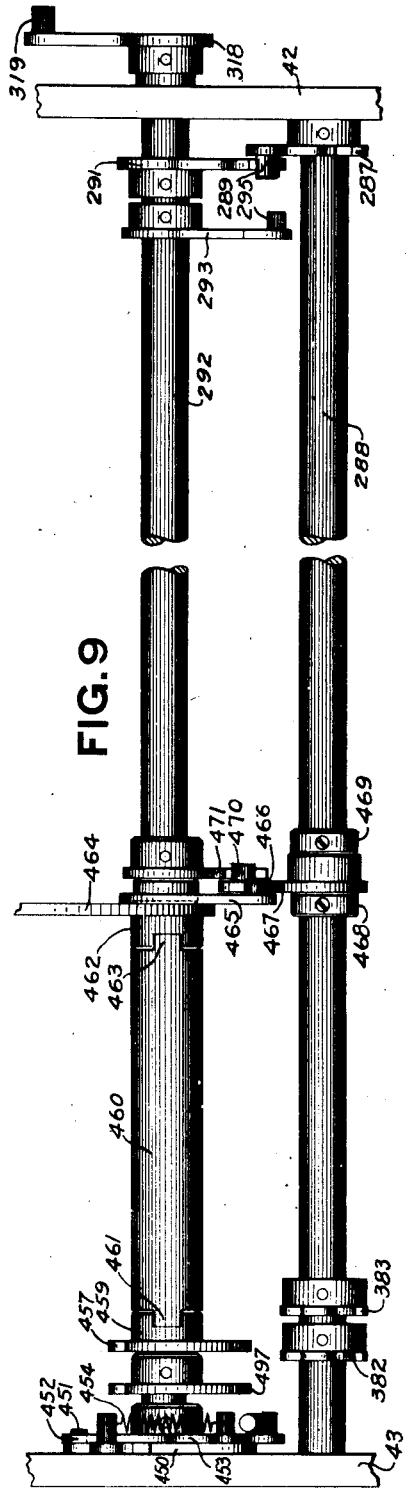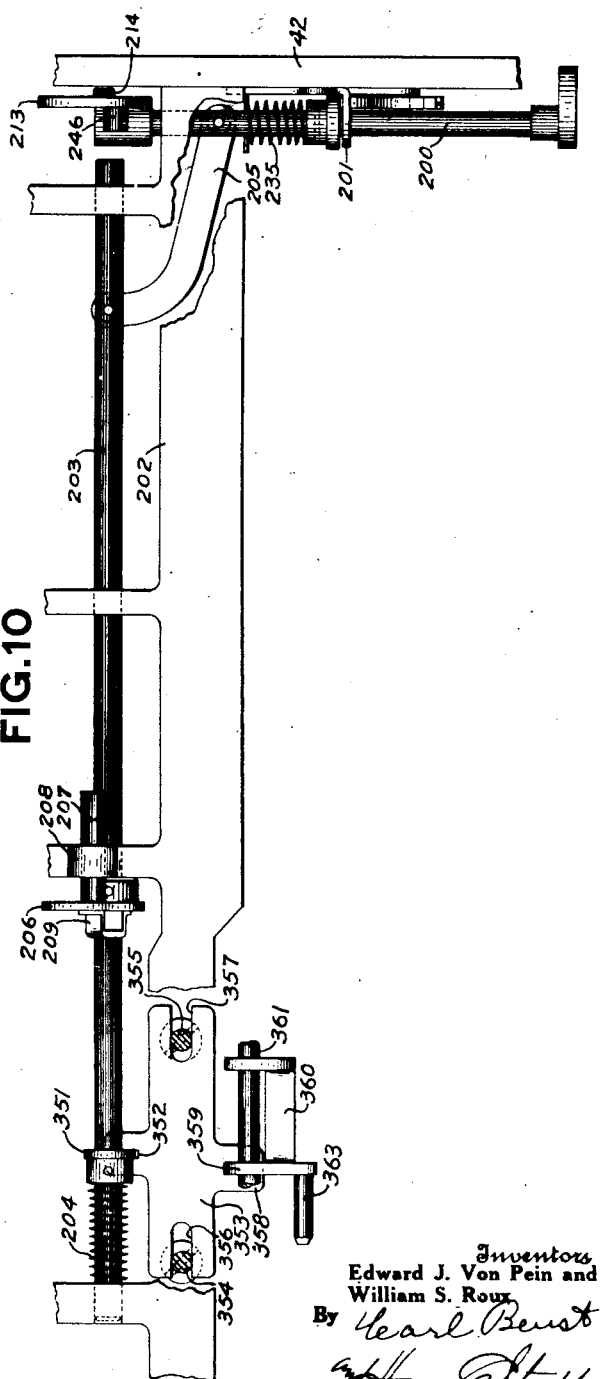

Sept. 22, 1931.  E. J. VON PEIN ET AL  1,824,247
CASH REGISTER
Filed June 14, 1922   10 Sheets-Sheet 9

Inventors
Edward J. Von Pein and
William S. Rou...
By
Their Attorneys

Sept. 22, 1931.  E. J. VON PEIN ET AL  1,824,247
CASH REGISTER
Filed June 14, 1922   10 Sheets-Sheet 10

Inventors
Edward J. Von Pein and
William S. Roux
By
Their Attorneys

Patented Sept. 22, 1931

1,824,247

UNITED STATES PATENT OFFICE

EDWARD J. VON PEIN AND WILLIAM S. ROUX, OF DAYTON, OHIO, ASSIGNORS, BY MESNE ASSIGNMENTS, TO THE NATIONAL CASH REGISTER COMPANY, OF DAYTON, OHIO, A CORPORATION OF MARYLAND

CASH REGISTER

Application filed June 14, 1922. Serial No. 568,161.

This invention relates to improvements in accounting machines and has more particular relation to those which, in addition to making a record upon totalizers, make an additional printed record of all transactions, and indicate the same, and in particular accumulate totals and print them.

It is an object of this invention to provide mechanism whereby an itemized receipt with the total and a transaction classification character printed thereon may be issued by a few, simple, conveniently performed manipulations.

Another object is to provide counting mechanism for recording the number of transactions of various classifications.

Another object is to provide mechanism which controls the operation of certain keys in relation to the operation of other keys.

Still another object is to provide means whereby the printing wheel, operated by a transaction key, can not be restored to normal position prior to the total printing operation.

Still another object is to provide means for preventing the release of the charge key prior to the total printing operation.

Still another object is to provide means whereby it is necessary to operate the total printing mechanism before restoring certain operated mechanism to normal position.

With these and incidental objects in view the invention consists of certain novel features of construction and combinations of parts, the essential elements of which are set forth in appended claims and a preferred form or embodiment of which is hereinafter described with reference to the drawings which accompany and form part of this specification.

Of said drawings:

Figs. 1A and 1B taken together constitute a plan view of the machine.

Fig. 2 is a rear elevation of the machine showing the special key stop or lockout mechanism.

Fig. 3 is a transverse sectional view of the machine taken on the line 3—3 of Fig. 1A, looking in the direction of the arrows.

Fig. 4 is a detail view of the key coupler locking mechanism.

Fig. 5 is a transverse sectional view of the machine taken on the line 5—5 of Fig. 1B, looking in the direction of the arrows.

Fig. 6 is a detail sectional view of the item totalizer.

Fig. 7 is a detail view of the Received on account and Paid out keys showing their means for setting the printing wheel and also their interlocking mechanism.

Fig. 8 is a detail view of the charge key and its associated mechanism showing the method of setting the type wheel, special indicator and its interlocking mechanisms.

Fig. 9 is a detail plan view of the transaction type wheel setting mechanism.

Fig. 10 is a detail plan view of the Charge key together with mechanism for engaging the special charge counter.

Fig. 11 is an elevation of the printer and motor.

Fig. 12 is a view of a receipt issued by the machine.

Fig. 13 shows a fragmentary portion of the detail strip.

The objects of the invention are herein shown as carried out in connection with a machine of the general type shown in Letters Patent of the United States granted to Cleal, No. 718,565 and No. 773,060, and E. J. Von Pein, No. 1,371,653, and No. 1,555,534 and No. 1,593,203, granted July 20, 1926.

This machine includes a series of manipulative devices, such as keys, which operate mechanism to indicate items, enter the items in one or more totalizers, set up type, and operate a printing mechanism to make a printed record of items on an issuing receipt. The machine also includes mechanism for printing the amount accumulated in a totalizer on a record strip kept in the machine and on said issuing receipt.

Figure 1A:
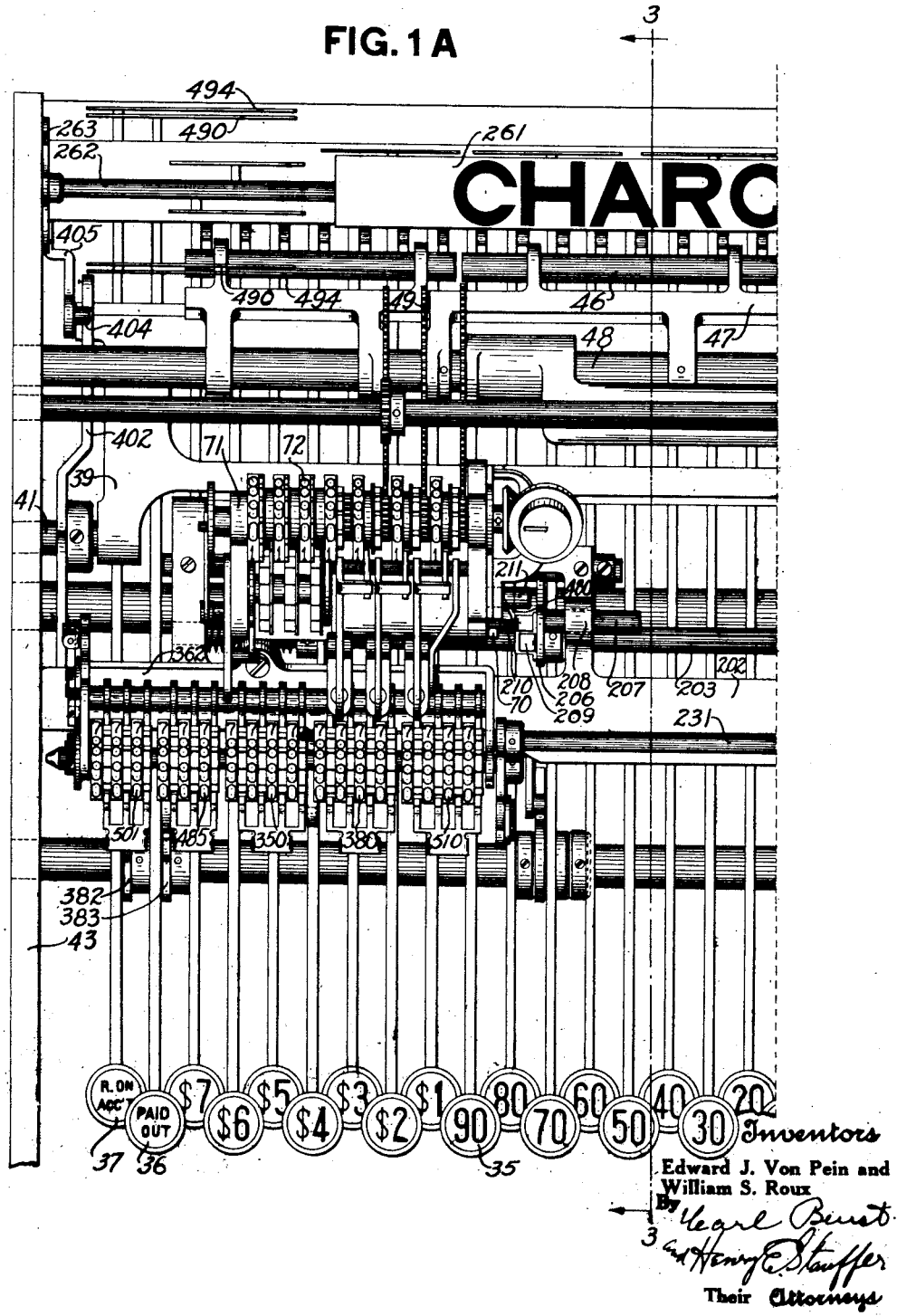

Item keys 35, and special keys 36 and 37 (Figs. 1A, 1B, and 5) are pivoted upon a transverse rod 38, and when the forward ends of one or more of them are depressed they engage and rock a key coupler 39 which is provided with trunnions 40 and 41 journaled in side frames 42 and 43 respectively. Pivotally attached to the rear end of each item key is an arm 44, each formed with a notch 45, adapted, when a key is operated, to engage a transverse rod 46 on an actuator frame 47, pivoted on a transverse rod 48, to rock said frame different distances according to the value of the operated key. The notches 45 are located at varying distances from the pivotal connection between the arms and keys, to effect a differential rocking of the frame 47. There is a frame 47 for each denominational group of keys. Each frame has attached to it a registering segment or actuator 49.

At each operation of the item keys 35 (Fig. 15) which imparts an oscillatory motion to the key coupler 39, a double rack 53 is raised and lowered to give a complete rotation to a shaft 54. The key coupler is connected to the rack 53 by a roller 55 cooperating with a slot 56 formed in the rack. This rack is provided with a bifurcated end guided on a stud 57 and with two opposing racks adapted alternately to mesh with a pinion 58 fast on the shaft 54. A spring 59 holds the left hand rack in engagement with pinion 58, which relation of rack and pinion is maintained during the upward movement of the rack 53 by means of a flange 60 thereon and a cooperating flange 61 projecting from the frame of the machine. At the end of its upward movement the rack 53 is forced to the left by a spring actuated arm 62 and the right hand rack moved into engagement with the pinion, the flanges 60 and 61 cooperating to maintain this relation during the downward movement of said rack 53. A ratchet wheel 63 secured on the shaft 54 and a spring pressed pawl 64 pivoted on the frame prevent retrograde motion of the shaft 54 after a key 35 has been depressed a predetermined amount.

A cam 68 carried by the shaft 54 (Fig. 3) cooperates with rolls 69 on a bifurcated arm 70 operatively connected to a totalizer frame 71 to rock the pinions of the rotatable elements of the totalizer into engagement with the registering segments. All of this structure is well known in the art and is shown here for illustrative purposes only.

Totalizers

The totalizers are of the usual form, the right hand a transaction and printing totalizer, and the left hand a grand total reading totalizer. This grand totalizer 72 is mounted in the pivoted frame 71 (Figs. 1A and 3), and includes a plurality of rotatable elements, each appropriate to a numerical order, as is usual in these devices. The lower order of rotatable elements also includes pinions adapted to engage the registering segments 49 as the totalizer is rocked. Said rotatable elements are caused to rotate to a position appropriate to the total of the items entered by the keys.

The right-hand, or transaction and printing totalizer (Figs. 1B, 5 and 6), is mounted in a pivoted frame 73, and includes a plurality of rotatable elements, each appropriate to a numerical order. Each of the rotatable elements includes a gear 74 in mesh with a gear 75, rotatably mounted on a shaft 76 mounted in brackets on the totalizer frame 73, and carrying a stepped scroll disk 77. The lower order of rotatable elements also includes pinions 78 adapted to engage a group of registering segments 79 connected to and operating simultaneously with the registering segments for the grand totalizer. Any movement of the totalizer elements will be transmitted directly to the stepped scroll disks 77, so that the scroll disks are caused to rotate to a position appropriate to the total of the items entered on the totalizer.

Item printing mechanism

Each of the segments 79 (Figs. 1B and 5) for the right hand or recording totalizer, in addition to engaging with totalizer pinions, meshes with a pinion 80. One of these pinions is fastened to the left hand end of a shaft 81 while the other pinions are mounted upon the left hand ends of telescopic sleeves 82 (Fig. 14) which extend to the right beyond the frame of the machine proper and on their right hand ends carry printing wheels 83 (Fig. 11) for printing the detail transactions on an issuing receipt strip 84. This strip (Figs. 11 and 12) is run from a supply roll (not shown) around a guide roll 85, passing between the printing wheels 83 and a platen 86 so that when the platen is operated, an impression will be made on the strip.

The mechanism for feeding the issuing strip 84 includes a feed roller 90, mounted on a shaft 91 journaled in the printer plate 92, and having secured thereto a ratchet wheel (not shown) which is engaged by a spring controlled pawl 93 pivoted on an arm 94 secured to the trunnion 40 upon which the key coupler oscillates. At each operation of an item key 35, which imparts an oscillatory motion to the key coupler 39, the pawl 93 rotates the feed roller 90 in a counter-clockwise direction. A spring controlled retaining pawl 95 prevents retrograde motion of the feed roller. Directly above the feed roller, and in contact with the same, is a tension roller 96 freely mounted on a stud, carried by a spring controlled manually operated lever 97 fast on a rod 98 loosely mounted in the printer plate. The issuing receipt strip 84, passing between the feed roller and the tension roller, feeds toward the front of the machine a distance equal to the line spacing of the printing at each operation of an item key.

To secure a visible impression a suitable continuous inking ribbon 99 is wound around guide rolls 100 mounted in the printer frame and over an inking roller 101 mounted upon a stud 102 projecting from the printer frame. This ribbon is held taut by a tension roll 103 supported in a frame pivoted upon a rod 104, supported in the printer frame. The ribbon is fed at each operation of an item key by means of a link 105 connected to the arm 94 and to the ribbon feeding lever 106 which carries a spring actuated pawl (not shown) for conveying rotary motion to the ink roller 101.

The issuing receipt strip 84 (Fig. 12) has printed thereon, by mechanism previously described, the various items 87 of the transaction, and also a total 88 of the same with a character 89 designating the kind of transaction which is printed by the following mechanism.

*Total printing mechanism*

The total printing mechanism in general is substantially the same as that described in detail in the application of Edward J. Von Pein, Serial No. 293,141. It will be briefly described here.

The total printing wheels 110 are twice the diameter of the item printing wheels 83, and contain two sets of type characters, one set for printing upon the issuing receipt strip and the other for printing upon the total record strip 111, a facsimile of which is shown in Fig. 13. The complete mechanism for printing the total record strip 111, which contains a total of the records accumulated in the totalizer, is not shown here.

The special characters to the right of the figures represent the kind of transactions and are printed by a special printing wheel which will be hereinafter described.

The setting of the total printing wheels 110 (Fig. 11) is effected in the same way as in the machine described in the Von Pein application and also in the above mentioned Patent No. 1,593,203, referred to, therefore but a brief description will be given here.

Upon operation of the total printing actuating means, an operating lever 112 (Fig. 14) is moved in a clockwise direction and rocks a frame 113 mounted on a shaft 114, the frame 113 and lever 112 being connected by a link 115. This movement of the frame 113, permits the springs 116 to move the segment levers 117 in a clockwise direction, and, through partial gears 118 rotatably mounted on a shaft 119 and meshing with segments 120 (Fig. 1B) on telescopic sleeves 121 carrying yoked feeler fingers 122, move said fingers in a counter-clockwise direction, as viewed in Fig. 5, into engagement with scroll disks 77.

Figure 14:
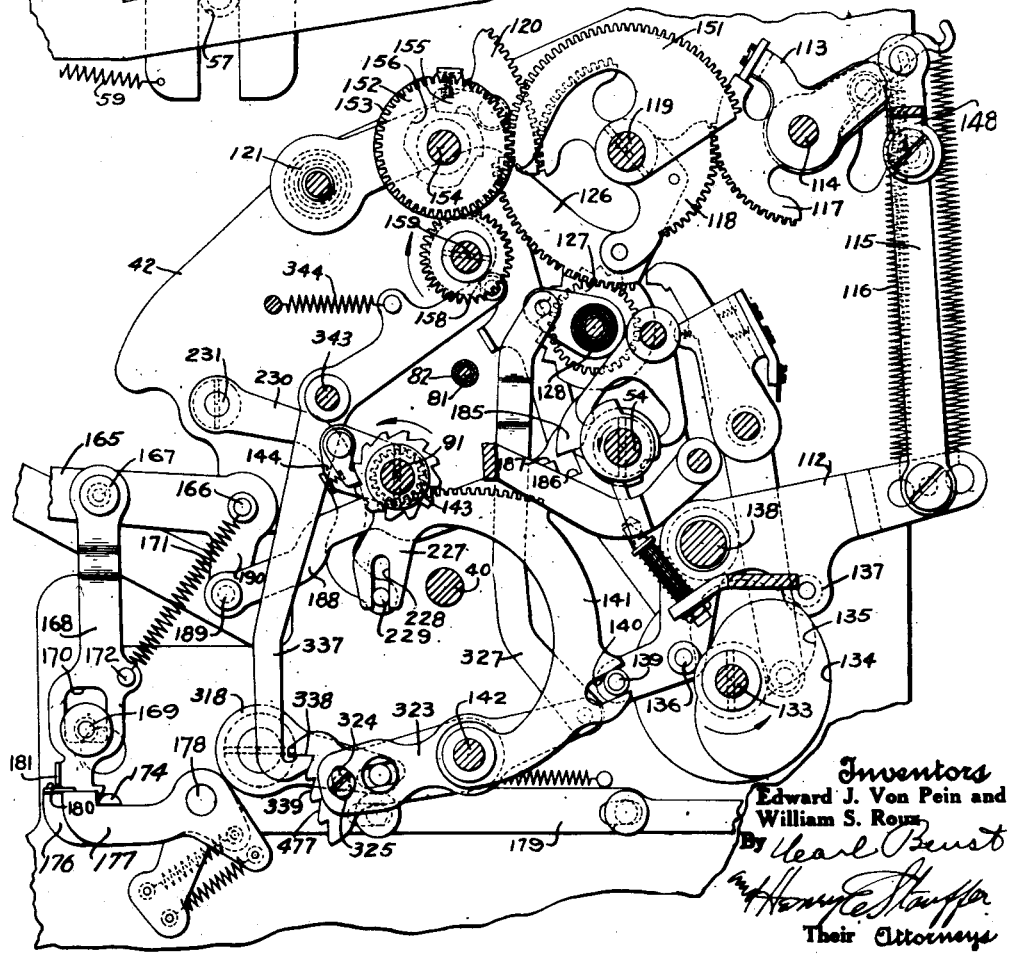
Fig. 14 is a transverse sectional view taken on the line 14—14 of Fig. 1B.

Referring to Fig. 14, the partial gears 118 carry segments 126 which mesh with gears 127 fastened to the left hand ends of telescopic sleeves 128 which on their right hand ends carry total printing wheels 110 (Fig. 11). As the feeler fingers 122 (Fig. 5) swing into contact with the stepped scroll disks, the total printing wheels are rotated to positions corresponding to the total of the items accumulated in the totalizer.

At the proper time, and by the operation of the totalizing mechanism, a platen supporting block 129 will be raised, bringing a platen 130 into contact with the type wheels 110. The platen supporting block 129 (Fig. 11) is pivotally mounted upon an arm 131, pivoted upon the stud 132 which projects from the printer plate 92.

The platen block 129 is operated by a cam (not shown) secured to the shaft 133. Cooperating with this cam is a roller 123 carried by a lever 124 pivoted upon the stud 132 and connected to the arm 131. By this connection the block 129 is operated to take an impression from the printing wheels 110. The upper end of the lever 124 is connected by a link to an impression device (not shown) for taking impressions upon the detail strip, as shown in the Von Pein application referred to.

The mechanism for giving additional or greater movement to the feed roller 90, when printing totals, to feed the issuing receipt a distance sufficient to bring the total past a severing means 125, is the same as that of the Von Pein application and Patent No. 1,593,203, referred to, and briefly as follows: Fast upon a shaft 133 (Fig. 14) are two cams 134 and 135 which impart an oscillatory motion to the lever 112 by contact with anti-friction rollers 136 and 137 carried on studs mounted in the lever 112 pivoted upon a shaft 138. Carried by the lower end of the oscillatory lever 112 is an anti-friction roller 139 cooperating with a slot 140 in a segment arm 141, pivoted upon a stud 142 mounted in the machine frame 42. This segment arm meshes with a pinion 143 secured to an arm 144 pivoted upon the shaft 91, and having a slip pawl and ratchet driving connection with the feed roller. As the arm is oscillated, the feed roller is rotated to feed the issuing strip to bring the total past the severing means.

The mechanism for resetting the totalizer to zero at the time of printing the total is identical with that described fully in the Von Pein application and Patent No. 1,593,203, referred to, and will be but briefly described here.

Figure 16:
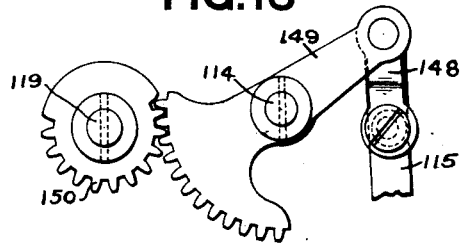
Fig. 16 is a detail view of the totalizer turn-to-zero shaft driving mechanism.

The operating lever 112 (Fig. 14) which is actuated by the operation of the electric motor, is connected by the link 115 and a second link 148 (Figs. 14 and 16) to a segment lever 149 pinned on the shaft 114 and meshing with a partial gear 150 which is pinned to the shaft 119. A segment 151, also pinned to the shaft 119, meshes with a gear 152 attached to a disc 153 and freely mounted on a shaft 154. The disc carries a spring controlled pawl 155 cooperating with a ratchet wheel 156 fixed to a gear 157 (Fig. 1B) meshing with a pinion 158 (Fig. 14) secured to a shaft 159 coupled with the totalizer resetting shaft 160 (Figs. 1B, 5 and 6).

An electric motor is operatively associated with the total printing mechanism, and means is provided for locking the item entering mechanism and releasing the motor when it is desired to print a total of a transaction, which means is actuated by the total printing mechanism to arrest the motor and to release the item entering means.

An electric motor 164 (Fig. 11), which primarily serves as an actuator in connection with the printing of totals on the issuing receipt strip and also on the total record strip, is mounted on the right hand side of the machine frame and directly under the printer. The motor drives the printing mechanism through a clutch and train of gears to the shaft 133 (Fig. 14) which makes one complete rotation in a counter-clockwise direction during each operation of the total printing mechanism.

The starting of the motor is manually controlled by a lever 165 (Figs. 1B, 5, 11 and 14) pivoted on a stud 166 projecting laterally from the side frame 42. Pivoted on a stud 167 mounted in the lever 165, is a downwardly extending link 168 guided near its lower end by a stud 169 mounted in the side frame of the machine and projecting through an opening 170 in the link 168. A spring 171 attached to the pivot stud 166 and to a pin 172 projecting from the link 168, normally holds the lower side of the opening 170 in contact with the stud 169. The lower end of the link 168 has an angle edge 173 which contacts a pin 174 projecting from the side frame of the machine, which, as the lever 165 is depressed, causes the link 168 to swing slightly in a clockwise direction. As a shoulder 175 on the link 168 moves past the flat sided pin 174 the spring 171 will cause the link 168 to latch under the pin and retain the same in such position until near the end of the total printing operation.

Two spring controlled levers 176 and 177 freely mounted upon a stud 178 projecting laterally from a horizontal bar 179, are normally in contact with the flat side of the pin 174. On the forward end of the lever 176 is a formed ear 180 which overlaps the forward end of the lever 177. An ear 181 formed on the link 168 will, when the motor starting lever 165 is depressed, contact the ear 180 and cause both levers 176 and 177 to swing on their pivot 178, lowering the forward end of the lever 177 until it is below the flat side of the pin 174, when the bar 179 moves toward the rear of the machine under the tension of a spring (not shown) and draw the levers 176 and 177 until the forward end of the lever 177 is underneath the pin 174, and the formed ear 180 on lever 176 assumes a position to the right of the formed ear 181 on the link 168. The horizontal bar 179 is supported upon studs engaging slots in the bar which permits a sliding movement of the bar to the right to release and start the electric motor, a full description of which is given in the Von Pein Patent No. 1,593,203, previously referred to.

As the horizontal bar 179 moves forwardly to its normal position, it carries with it levers 176 and 177. During this forward movement the ear 180 contacts the right hand side of the ear 181 on the link 168 and swings the link on its pivot 167, thereby disengaging the shoulder 175 from the pin 174, to allow the motor starting key 165 to return to its normal position by the action of the spring 171. The forward movement of the bar 179 will also allow the forward end of the lever 177 to assume its normal position to hold the bar 179 until the motor starting key is again pressed. The lever 177 will be returned to its normal position even if the starting key 165 is held in depressed position. It is, therefore, impossible to get repeated operations of the total printing mechanism by holding the starting key depressed.

Figure 22:
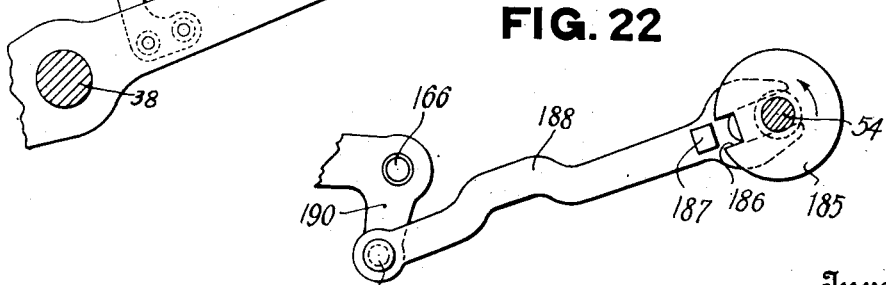
Fig. 22 is a detail of the interlock between the item entering keys and the motor key.

To prevent a simultaneous manipulation of both the item entering keys and the motor starting key, a device is provided which will lock either while the other is being manipulated. Fastened on the shaft 54 (Figs. 14 and 22) which makes a complete rotation each time the item keys are operated, is a disc 185 provided with a notch 186 adapted to cooperate with a square pin 187 projecting laterally from a pitman 188. The rear end of the pitman is bifurcated and embraces the shaft 54 to be guided thereby, as the starting key is operated. The forward end of the pitman is pivoted on a stud 189 mounted in an arm 190 extending downwardly from the motor starting key. In the event that the motor starting key 165 is depressed before depressing any of the item entering keys 35, the pin 187 will enter the slot 186 in the disc 185 and thereby prevent rotation of the shaft 54, which, through the key coupler 39 and member 53 previously described, will lock the item keys against manipulation.

In addition to the electric motor means for operating the total printing mechanism, a manually operated crank 183 (Fig. 11) is provided, which will be but briefly described here as it is fully described in the Von Pein application and Patent No. 1,593,203 referred to. The crank 183 is freely mounted on a stud 184 projecting from the printer plate 92. Co-operating with this crank is a flexible driving device (not shown) connecting the crank and a driving gear which cooperates with another gear to rotate the driving shaft 133.

A roll 196 on an arm 191 (Fig. 11) pivoted on the stud 132 is drawn into engagement with a cam 193 fast on the driving shaft 133 by means of a spring 194. The cam and spring cooperate to equalize the work of the total printing crank to permit of a nearly uniform rotation being given to the driving shaft 133. All of this is fully described in the Von Pein application and Patent No. 1,593,203 referred to.

So far, the construction is substantially that of the Von Pein application and Patent Nos. 1,555,534 and 1,593,203 referred to.

In a "cash" transaction the items are entered in both the transaction totalizer and the grand totalizer, and in addition are indicated and printed, all of which is fully described in the Von Pein application and patents previously referred to.

*Charge transaction mechanism*

In recording a "charge" transaction the items are entered only in the transaction totalizer, the grand totalizer being disabled by the operator moving a horizontal rod 200 (Figs. 1B, 5, 8 and 10) which will hereinafter be known as the "Charge" key. This key is located at the right hand side of the machine and is supported by a bracket 201 (Fig. 10), and a tie bar 202, and shown in its normal or outward position. When moved inwardly by the operator, a horizontal rod 203 will be moved laterally to the left against the compression of a spring 204, the rod being connected to the "Charge" key by a link 205 one end of which is pivoted to the rod and the other end to the key. The rod 203 is supported by various lugs projecting from the tie bar 202. Secured to this rod is an arm 206 (see also Fig. 3), having a laterally projecting pin 207 cooperating with a hole in a lug 208 to prevent rotation of the rod 203.

Fastened to the arm 206 (Figs. 3 and 10) is a bracket 209 (Figs. 1A and 10) which, when the rod 203 moves laterally to the left, engages a spring actuated plunger 210 (Fig. 1A) mounted in the grand totalizer frame and moves the plunger out of alignment with the totalizer engaging arm 70 (Fig. 3), which normally moves this totalizer into operating engagement with the actuators, thereby rendering said arm ineffective and leaving this totalizer in normal position during the operation of the machine. As the arm 206 moves to the left a pin 211 (Fig. 1A) fastened in the totalizer frame will enter a hole 212 (Fig. 3) in the arm to hold the totalizer frame in disengaged position.

Fastened to the inner end of the "Charge" key 200 (Figs. 8 and 10) is an upwardly extending arm 213 having a laterally projecting pin 214 cooperating with a slot 215 formed in an arm 216, pivoted on a stud 222 secured in the right side frame. The lower end of this arm is formed with an ear 217 which, as the arm moves in a clockwise direction, will engage an inclined edge 218 on the forward end of a bell crank lever 219 and cause this lever to swing in a counter-clockwise direction until the ear passes a shoulder 220, when the lever will be swung in the opposite direction by a spring 221 and will latch the arm 216 and the "Charge" key in operated positions.

The "Charge" key remains latched in its operated position until during the totalizing part of the operation when the segment arm 141 (Fig. 14) is moved in a counter-clockwise direction. A projection 227 on the arm 141 is provided with a slot 228 engaging a pin 229 projecting laterally from an arm 230 secured to a shaft 231. As the arm 230 is moved in a clockwise direction (Fig. 14), the shaft 231 and an arm 232 fastened thereto (Fig. 8) move in a counter-clockwise direction to move the bell crank lever 219 in a similar direction and unlatch the "Charge" key allowing it to be returned to its normal position by a spring 235. The upwardly extending part of the bell crank arm has a laterally projecting pin 233 which is held in contact with the arm 232 by the spring 221. As the arm moves downwardly an inclined surface 234 engages the pin 233 to give the proper movement to the bell crank lever.

When the "Charge" key is pressed inwardly a spring 239 (Fig. 8), entwined about a vertical rod 240, is compressed between lugs 241 and 242 formed on the rod and a formed ear 243 on the rear end of a lever 244 pivoted on a rod 245 supported in the frame of the machine. The forward end of this lever extends downwardly to engage a roller 246 mounted on a stud 247 secured in the arm 213.

Figure 15:
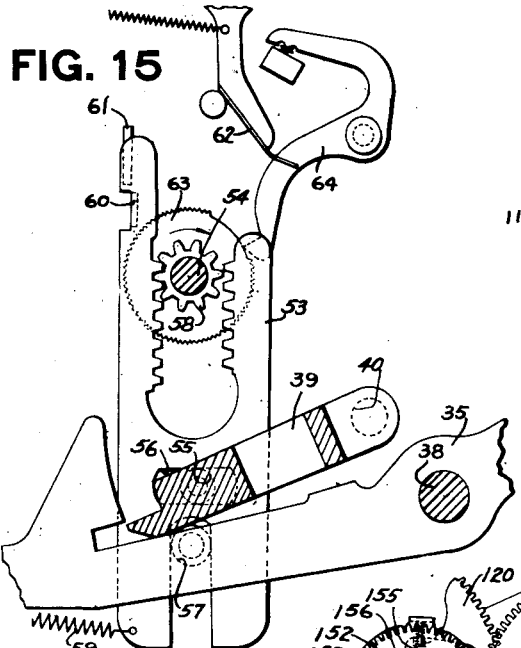
Fig. 15 is a detail elevational view of the driving connection between the key coupler and the rotation shaft.
Figure 21:
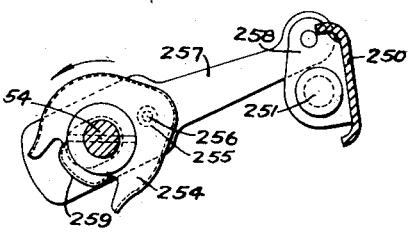
Fig. 21 is a detail view showing the back rod or indicator detent operating mechanism.

The lower end of the bar 240 is formed with a shoulder 248 which is normally under a flange 249 on the indicator retaining bail 250 pivoted at each end on studs 251 secured in the side frames of the machine. This bail is held in normal position by two springs 252 and 253 (Fig. 2) until an operation of item keys 35 causes a rotation of the shaft 54 (Figs. 15 and 21). Fastened to this shaft is a cam 254 which cooperates with a roller 255 mounted on a stud 256 secured to a pitman 257, to operate the bail 250. One end of this pitman is guided by the shaft 54 and the other end is pivoted to an arm 258 on the bail.

As the shaft 54 (Fig. 21) rotates, the node 259 of the cam 254 will engage the roller 255 operating the pitman 257 to move the bail 250 on its pivots in a clockwise direction to the extent of removing the flange 249 (Fig. 8) from the shoulder 248 allowing the vertical rod 240 to be moved upwardly under the action of the expansion spring 239 until a lug 260 again engages the ear 243.

The upward movement of the rod 240 is sufficient to give a quarter turn to a "Charge" indicator 261 (Figs. 1A, 1B and 8) fastened on a rod 262 journaled in supports 263 and 264 fastened to the side frames. Fastened to the rod 262 near the right hand end is an arm 265 which is pivoted by a stud 266 to the vertical bar 240. The word "Charge" appears on two opposite sides of the indicator, the other two sides being blank and normally exposed to the front and rear of the machine.

As the bail 250 returns to its normal position the lower end of the vertical bar 240 will be above the flange 249, and as the "Charge" key is released and returned to its normal position during the totalizing operation, the bail will again be operated to allow the bar 240 to return to its normal position as the lever 244 is moved in a counter-clockwise direction by a spring 267, one end of which is attached to the lever and the other end to a pin 268 fastened in the bail.

The bail is operated during the totalizing operation by an arm 269 fastened to the shaft 114 (Figs. 5 and 14) and having a stud 270 connecting the arm to a vertical bar 271 bifurcated at its lower end and guided by a stud 272 secured in the side frame. An ear 273 projecting laterally from the bar 271 engages a pin 274 secured in the bail to move the bail in a counter-clockwise direction.

The operation of the bail by the totalizing mechanism will in addition to allowing the "Charge" indicator operating rod 240 to return to normal position, allow item indicators 275 which have been elevated by the item keys used in connection with the "Charge" transaction, to be returned to their normal positions.

A pin 280 projecting laterally from the motor starting lever 165 (Fig. 8) cooperates with an upwardly projecting arm 281 on a bracket 282 secured to the "Charge" key, to prevent the operation of the "Charge" key after the motor starting lever is operated, and also to prevent the operation of motor starting lever if the "Charge" key is held in a position intermediate the normal and operated positions. A pin 283 secured in the bracket 201 and projecting under the bracket 282 prevents strain upon the bracket when the arm 281 is directly under the pin 280 and pressure is placed on the lever 165.

The bracket 282 has a downwardly extending arm 284 provided with a pin 285 engaging a slot 286 formed in the upper end of an arm 287 secured to a shaft 288 supported at each end in the side frames.

The arm 287 has a laterally projecting pin 289 engaging a slot 290 in an arm 291 fastened to a shaft 292 journaled at each end in the side frames. Normally the shaft 292 is free to move in a clockwise direction independently of the arm 287 by mechanism which will hereinafter be described.

As the "Charge" key is operated and the arm 287 moves in a counter-clockwise direction the pin 289 entering the slot 290 will move the shaft 292 in a clockwise direction and assist in returning it again to normal position with the return of the "Charge" key to its normal position. Fastened to the shaft 292 is an arm 293 extending upwardly and into contact with an angle plate 294 fastened to the tie bar 202. This arm has a laterally projecting pin 295 cooperating with an arm 296 secured to the shaft 231 to lock the "Charge" key either in its normal position or its operated position during the operation of the totalizing mechanism. As the shaft 231 moves in a counter-clockwise direction the lower end 297 of the arm 296 will be raised to a position either in front or back of the pin 295, thereby preventing manipulation of the "Charge" key until just before the end of the totalizing operation.

To make it necessary for the operator to operate the "Charge" key before pressing an item key in a "charge" transaction, a device is provided which locks the "Charge" key in normal position should an item key be pressed first.

Secured to the trunnion 40 on the key coupler to move with said coupler is an arm 301 (Fig. 8) the forward end of which is adapted to engage a pin 302 projecting from a lever 303 pivoted on a stud 304 secured in the bracket 201. This lever has a forward extension 305 which is elevated into the path of the bracket 282 to prevent the "Charge" key from being operated after an item key has been operated. The lever is normally held in contact with a pin 306 projecting from the bracket 201 by a spring 307, one end of which is attached to the lever and the other end to a latch pawl 308 pivoted on a stud 309 secured in the bracket 201. Formed in the lower end of the latch pawl are two notches 310 and 311 cooperating with an ear 312 formed on the lever 303 to retain the lever in either its normal or its operated position. As the lever moves in a counter-clockwise direction the ear 312 moves out of the notch 310 and into the notch 311, and during the totalizing operation a pin 313 projecting from the arm 296 will engage the upper end of the latch pawl and move the same in a clockwise direction allowing the lever 303 to be returned to normal position by the spring 307.

A simultaneous operation of the "Charge" key and an item key is prevented by the arm 301 cooperating with the ear 217 on the arm 216, and while this mechanism allows the operation of an item key after the "Charge" key has been operated, it does not permit the operation of the "Charge" key after the slightest depression of an item key.

The shaft 292, and parts secured thereto, are held in normal positions by a spring 317 (Fig. 4). Fastened to the shaft 292 is an arm 318 (Figs. 7 and 8) provided with a pin 319 projecting laterally from the arm and entering an elongated opening 320 in a ratchet arm 321 freely mounted on a stud 322 supported in the side frame. This ratchet arm is fastened to a lever 323 by a screw 324 (Figs. 8 and 14) cooperating with an elongated opening 325 in the lever which allows pivotal adjustment between the two pieces. The lever is freely mounted on the stud 322 and at its left hand end carries a stud 326 (Fig. 8) to which is pivoted the lower end of a link 327. The upper end of the link is pivoted on a stud 328 secured in an arm 329 fastened to one end of a sleeve 330. Secured to the other end of this sleeve is a printing wheel 331 provided with two sets of type blocks for printing on both the issuing receipt and the total record strip.

When the "Charge" key is operated the printing wheel is rotated in a clockwise direction, moving into printing position type blocks 332 and 333 which bear engraved characters "Ch." representing a "charge" transaction.

As the lever 323 moves to operate the printing wheel, a spring actuated retaining pawl 337 (Fig. 8) will disengage from a notch 338 and engage a second notch 339 and retain the printing wheel in its operated position until after the printing time of the totalizing operation, when a cam 340, fastened to the shaft 159 and cooperating with a roller 341 mounted on a stud 342 secured in the retaining pawl 337, will move said pawl in a counter-clockwise direction on its pivot 343, disengaging the retaining pawl from the ratchet arm, thereby allowing all parts affected to return to normal positions under the tension of the spring 317 (Fig. 4).

A spring 344 (Fig. 8), one end of which is attached to a pin 345 fastened in the retaining pawl 337 and the other end secured to a pin 346 projecting from the side frame, will at all times hold the roller 342 in engagement with the cam 340.

The number of "charge" transactions are registered upon a counter 350 (Figs. 1A, 17 and 18) which is mounted upon the tie bar 202. As the horizontal rod 203 is moved to the left by the operation of the "Charge" key, an arm 351 (Figs. 10 and 18) secured to the rod and engaging a slot 352 in a horizontal plate 353 will move said plate laterally. This plate is guided in its movement by screw studs 354 and 355 fastened in the tie bar 202 and cooperating with slots 356 and 357 in the plate. On the forward side of this plate is a bifurcated projection 358 engaging a downwardly projecting arm 359 on a yoke 360.

The yoke is freely mounted upon a shaft 361 which is supported at each end in a counter frame 362. Projecting laterally from the left hand side of the yoke is a pin 363 freely fitted in a hole in a carrying pawl arm 364 freely mounted on the shaft 361 supported at each end in the counter frame 362. As the plate 353 moves the yoke 360 to the left, the pin 363 will enter a slot 366 in an arm 367 pinned to the shaft 361.

The shaft 361 is connected to the shaft 231 by a link 368 (Fig. 3) having pivoted connections with an arm 369 fastened to the shaft 361 and an arm 370 fastened to the shaft 231. As the shaft 231 is moved during the totalizing operation, the shaft 361 will receive the same degree of movement to operate a counter carrying pawl 371 (Figs. 17 and 18) by the pin being in engagement with the arm 367. This carrying pawl operates the step by step counter 350 which records the number of "charge" transactions.

Upon the return of the "Charge" key to its normal position, the pin 363 will disengage from the arm 367 and a spring 372 will return the carrying pawl arm to its normal position. The carrying pawl is pivoted to the arm by a stud 373 and is held in contact with counter ratchets 374 by a spring 375. A spring actuated retaining pawl 376 prevents a retrograde movement of the counter wheels.

A "Customer" counter 380 (Figs. 1A and 17), also a step by step counter and mounted in the frame 362, is operated at each totalizing operation of the machine by a carrying pawl arm 381 fastened to the shaft 361. The construction of this counter is similar to that of the "Charge" counter.

When the "Charge" key is operated it is necessary to disable the "Received and account" and "Paid out" keys. Also if either of the latter keys is operated, it will disable the "Charge" key. Fastened to the shaft 288 (Fig. 7 and 9) are two upwardly extending arms 382 and 383 which, as the shaft moves in a counter-clockwise direction, will move into the plane of two plates 384 secured to the side of the keys 36 and 37, and prevent operation of said keys. Should either of these keys be operated previous to the operation of the "Charge" key, the plate 384, moving in the plane of the arms 382 or 383, will prevent a counter clockwise movement of said arms which disables the "Charge" key.

*Paid out transaction mechanism*

The "Paid out" and "Received on acc't" keys are of different construction from that of the item keys 35. The construction of these keys is substantially that shown in United States Letters Patent to E. J. Von Pein No. 1,371,653, dated March 15, 1921.

The keys 36 and 37 are of the construction shown in Fig. 7. It will be noted that these keys have a recess 390 so that when the key coupler 39 is resting on the keys 35, as shown in Fig. 5, it will not be resting on the keys 36 and 37. These keys are provided with notches 391 for cooperating with the key coupler in the same manner as the notches in the item keys, as is fully described in the Von Pein patent referred to.

By reason of the recess 390 of the keys 36 and 37, either of these keys may be given an initial depression independent of any movement of the key coupler.

This initial depression of these keys is for operating certain interlocking mechanisms before depressing the item keys.

Each of the keys 36 and 37 has pivotally mounted near its rear end a pair of pawls 392 and 393. This construction is substantially like the construction shown in the Von Pein patent, just above referred to, and is for holding the keys 36 and 37 in partially depressed positions. The normal positions of the pawls are substantially as shown in Fig. 7, wherein it will be seen that the pawl 392, which is pivoted at 394, is normally held against a stationary frame lug 395 by a spring 396 interposed between the pawl and a stud 397 carried by each of the keys. At its upper end the pawl 392 is provided with a hook end adapted to cooperate with a locking point of the pawl 393 as fully described in the Von Pein patent referred to. When either of the keys 36 and 37 is depressed, the rear end of the key will be elevated until the lower end of the pawl 392 passes clear of the stationary frame lug 395 when, under the action of the spring, the lower end of said pawl will move rearwardly above the frame lug. When the pressure on the forward end of the key 36 or 37 is removed, the pawl engaging the frame lug, will hold the rear end of the key elevated, in which position it will remain until the key coupler, operated by an item key 35, will engage a notch 391 and continue the movement of the key 36 or 37 and return it to its normal position, as fully described in the Von Pein patent referred to.

If the operator should depress an item key before depressing the "Paid out" key, then this latter key cannot be depressed until after completing a totalizing operation. Fastened to the key coupler trunnion 41 by a screw 401 (Fig. 4) and moving with the key coupler, is a lever 402, having its rear end formed to fit the lip 403 of the key coupler. As the rear end of this lever is elevated by the key coupler it will engage a pin 404 (Fig. 3) projecting laterally from a lever 405 and move this lever in a clockwise direction on a screw stud 406 secured in the side frame 43. A spring 407 (Figs. 2 and 3) with one end attached to a pin 408 fastened in the rear end of the lever and the other end attached to a pin 409 projecting from the side frame, will hold the lever in normal position as shown in Fig. 3, with an ear 410 in contact with a frame 411.

As the rear end 412 of the lever 405 moves downwardly it engages an inclined edge 413 of a horizontal bar 414 (Fig. 2) and moves said bar toward the left a sufficient distance to allow a spring actuated pawl 415 to move into the path of a pin 416 secured in the bar 414 and retain said bar in its operated position. The bar 414 is mounted upon screw studs 417 and 418 cooperating with elongated openings 419 and 420 in the bar.

The pin 416 has a slot 421 into which the end 422 of the pawl 415 enters as the bar 414 is moved to the left. The pawl 415 together with a latch plate 423 is freely mounted on the stud 417. A spring 424 with one end attached to the pawl 415 and the other end attached to the latch plate 423 normally holds the pawl against the pin 416 and also moves the pawl in a clockwise direction. Projecting laterally from the pawl 415 is a pin 425 cooperating with an opening 426 in the latch plate 423 to return the pawl to its normal position to release the bar 414 at the proper time during the totalizing operation. A spring 427 with one end attached to the latch plate 423 and the other end to the pin 416, normally holds the plate in contact with the pin 416.

As the vertical bar 271 moves downwardly during the totalizing operation to operate the bail 250, the lower end 398 of this vertical bar will engage an ear 399 formed on the latch plate 423 and move said plate in a counter-clockwise direction against the tension of the spring 427, and by the cooperating connection between the opening 426 and pin 425, move the pawl 415 also in the same direction, removing the end 422 of the pawl from the path of the pin 416 allowing the horizontal bar 414 to move a slight distance to the right but not return entirely until that time during the total printing when the vertical bar 271 returns to normal position.

The horizontal bar 414, being released by the pawl 415, will be retained in its intermediate position by the right hand end 428 of the latch plate 423 being elevated to the same plane and to the right of a downward projection 429 on a bell crank lever 430 pivoted on a stud 431 mounted in the horizontal bar 414. Attached to the lower end of the bell crank lever 430 is a spring 432 which holds the bell crank lever in normal position with a pin 433 secured to said lever resting upon the bar 414. When the totalizing mechanism is operated without operating an item key the right hand end 428 of the latch plate will engage the downward projection of the bell crank lever and move the same on its pivot 431.

The horizontal bar 414 is returned to normay position by a spring 389 one end of which is attached to the bar and the other end attached to a special key stop 434. This key stop is pivoted on the screw stud 418 and has an arm 435 extending to the left provided with a laterally projecting pin 436 cooperating with an inclined edge 437 of an opening formed in the horizontal bar 414. The spring 389, one end of which is attached to the key stop 434, will cause the key stop to move in a clockwise direction as the bar 414 toward the left, and in so doing, will place the shoulders 438 and 439 formed on the lower ends of the key stops in the planes of the rear ends 440 and 441 of the keys 36 and 37, respectively, and prevent the pressing of the special keys 36 and 37 after an item key has been pressed.

With the horizontal bar 414 in its operated position, and the shoulders 438 and 439 on key stop 434 in the path of the special keys 36 and 37, these keys are allowed a slight movement before engaging these shoulders to enable the keys to engage inclined faces 442 and 443 and slightly move the key stop in a counter-clockwise direction. This movement of the key stop provides a sufficient clearance between the pin 436 and the bar 414 to allow said bar to move laterally a short distance when the latch 415 is released, so that pressure exerted on the forward ends of the special keys will not hold the bar in a position in which it permits the latch to return to its latched position which would prevent the return movement of the horizontal bar 414 at the proper time.

When either of the special keys 36 and 37 is depressed in its proper order, its rear end 440 or 441 will be elevated to a position above the shoulders 438 or 439 on the key stop during its initial movement. Then as an item key is operated the special key will complete its operation, and returning to home or neutral position its rear end will move the key stop 434 in a counter-clockwise direction against the tension of the spring 389 until the end of the key will have passed below the shoulder formed on the lower end of the key stop, when the stop will move in a clockwise direction until the pin 436 engages the horizontal bar 414 which will place the lower ends of the key stops over the ends of the special keys and prevent the depressing of these keys again until after the total printing operation.

In a "paid out" transaction, where an item key is depressed following the initial movement of the "Paid out" key 36 it is necessary to operate the total printing mechanism before again operating an item key. To accomplish this the lever 402 (Fig. 4) has a laterally projecting ear 448 on its forward end which cooperates with an upwardly projecting arm 449 on a lever 450 freely mounted on the shaft 292. This lever has a laterally projecting pin 451 normally engaging the under side of a rearwardly projecting arm 452 of a lever 453 which is secured to the shaft 292. A spring 454 normally holds the pin 451 in engagement with the arm 452.

The operation of an item key, following the initial depression of the "Paid out" key will move in unison the key coupler 39 and the shaft 292. During the operation of these parts the ear 448 on the lever 402 will pass to the left of the upwardly projecting arm 449 (Fig. 4) and retard the movement of this arm against the tension of the spring 454. As the key coupler returns to normal position the ear 448, rising above the arm 449, will allow the arm to continue its movement in a counter-clockwise direction until the pin 451 engages the arm 452. In this position the arm 449 is in a plane with the ear 448 which prevents an operation of the key coupler again, until after a total printing operation which places all the mechanism in normal position.

Projecting laterally from the "Paid out" key is a pin 455 (Fig. 3) cooperating with edges of a formed opening 456 in a plate 457 pivoted upon the shaft 292. As this key is given its initial movement by the operator, the pin 455 will engage with the formed edge 458 and move the plate 457 in a counter-clockwise direction. This plate is secured to a hub 459 (Fig. 9) which is connected to the left hand end of a sleeve 460 by a clutch connection 461. The sleeve is loosely fitted to the shaft 292 and its right hand end is connected with a hub 462 by a clutch connection 463. The hub 462 is loosely mounted upon the shaft 292 and has fastened to it a grand totalizer throwout arm 464 (Figs. 3 and 9). Secured to this arm is a plate 465 having a laterally projecting pin 466 in the plane of an arm 467 freely mounted upon the shaft 288 and retained in lateral position by collars 468 and 469. The arm 467 has a laterally projecting pin 470 engaging an arm 471 fastened to the shaft 292.

The initial movement of the "Paid out" key moves the grand totalizer throwout arm 464 in a counter-clockwise direction to engage the pin 466 with the arm 467. As the "Paid out" key continues its operation during a further depression of an item key, the pin 455 will move downwardly in the opening 456 causing the totalizer throwout arm 464 to move an additional distance with the pin 466 in engagement with the arm 467 and pin 470 in engagement with arm 471, thereby moving the shaft 292 in a counter-clockwise direction. The totalizer throwout arm is held in normal position by a spring 472, one end of which is attached to the plate 465 and the other end to the tie bar 202.

The space between the pin 466 and the arm 467 permits the totalizer throw-out mechanism to be entirely effective before the transaction type wheel is moved when the "Paid out" key is operated.

Referring to Figs. 7 and 8, which are views of part of this mechanism shown from the opposite side from that of Figs. 3 and 4, the shaft 292, moving in a clockwise direction with the arm 318 secured to it, moves the ratchet arm 321 and its cooperating parts to place type blocks 475 and 476 containing the character "P" representing a "paid out" transaction, into printing position, and the ratchet arm retaining pawl 337 in the third notch 477 of the same.

The arm 291 which moves with the shaft 292 is provided with a shoulder 478 to prevent the operation of the "Charge" key when the "Paid out" key is operated, by moving into the path of the pin 289.

A key stop 479 (Fig. 2) prevents a simultaneous operation of the "Received on account" key and the "Paid out" key. This key stop is of the same form as those used for the item keys which are well known in the art.

A "paid out" transaction is recorded in the transaction totalizer in the usual way, but not in the grand totalizer which is disabled by the initial movement of the "Paid out" key, by the totalizer throwout arm 464 (Fig. 3). As this arm moves counter-clockwise the upper end 480 of the arm engages the spring actuated plunger 210 (Fig. 1A) to move the same laterally to a position whereby the bifurcated arm 70, which normally moves this totalizer into operating engagement with the actuators, will be rendered ineffective leaving this totalizer in normal position during the operation of the machine. This mechanism is fully described in the Cleal Patent No. 773,060, previously referred to.

Figure 19:
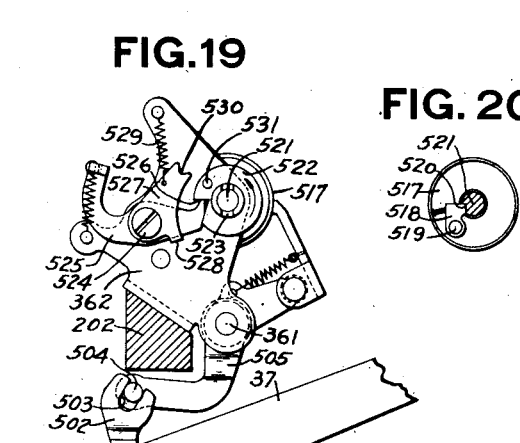
Fig. 19 is a detail elevational view of the special counter turn-to-zero mechanism.

A special counter 485 (Figs. 1A and 17) records the total number of Paid out transactions. This counter is mounted in the frame 362 with the other special counters and is a step by step counter actuated by a three-pronged pawl 486, pivotally mounted on a lever 487, fulcrumed on the shaft 361. Projecting laterally from the lower end of the lever is a pin 488 engaging a slot in an arm 489 which is fastened to the "Paid out" key 36. These parts are not shown in side elevation, but they are similar in form to those shown in Fig. 19, for the Received on account key and counter which will hereinafter be described.

Referring to Fig. 2, a "Paid out" indicator 490 is shown in operated position where it is held by the bail 250 until during the total printing operation, when it returns to normal position with the lower end resting upon the rear end of the "Paid out" key.

*Received on account transaction mechanism*

In a "Received on account" transaction, the key 37 (Fig. 1A) is given an initial movement, the same as key 36 previously described, after which, item keys 35 may be operated any number of times before pressing the "motor" lever 165 to operate the total printing mechanism.

A "Received on account" indicator 494 (Fig. 2) is elevated to view upon the first operation of an item key, and if two or more operations of item keys are made after pressing the "Received on account" key, the indicator 494 will return to normal position at the second operation.

This "Received on account" key 37 cannot be operated again during this transaction, as the special key stop 434 will be in its operated position until after the total printing operation, as previously described.

The special key stop 434 also prevents the pressing of the "Received on account" key 37 after an item key is operated as in a "cash" transaction.

The initial movement of the "Received on account" key prevents an operation of the "Charge" key 200, as it carries the plate 384, secured thereto, into the path of the arm 382 (Fig. 7) and maintains it there during its entire operation. This will prevent the shaft 288 from moving in a counter-clockwise direction, thereby locking the "Charge" key 200 in its outer position.

The "Received on account" key 37 has a laterally projecting pin 495 (Fig. 7) cooperating with the formed side 496 of an opening in a plate 497 fastened to the shaft 292. The plate will not be moved by the initial movement of the key, there being sufficient clearance between the pin 495 and the side of the opening. But as the key continues its movement the pin moves the plate in a clockwise direction which, being secured to the shaft 292 will, through mechanism previously described, move the printing blocks 498 and 499 into printing position. These type blocks have the character "R" to represent "Received on account". The ratchet arm 321 being moved its greatest extent, the retaining pawl 337 engages a notch 500 to retain the parts in their operated positions until during the total printing operation when they will return to their normal positions as previously described.

Each operation of this "Received on account" key is recorded in a special counter 501 (Figs. 1A and 17) mounted in the special counter frame 362. The construction of this special counter is similar to the other special counters previously described. The counter is operated by an arm 502 fastened to the special key 37. The arm has a slot 503 in its upper end which cooperates with a pin 504 projecting laterally from a carrying pawl lever 505 fulcrumed on the shaft 361. Items registered in connection with the "Received on account" key are recorded in both the transaction and printing totalizer and the grand totalizer in the same manner as cash transactions, the transaction totalizer resetting to zero during the total printing operation, all of which has previously been described.

A special counter 510 (Figs. 1A and 17) records the number of items by adding one each time the key coupler moves by the operation of item keys 35. This counter 510 is mounted in the special counter frame 362 and is a step by step counter similar in construction to the other special counters.

Figure 17:
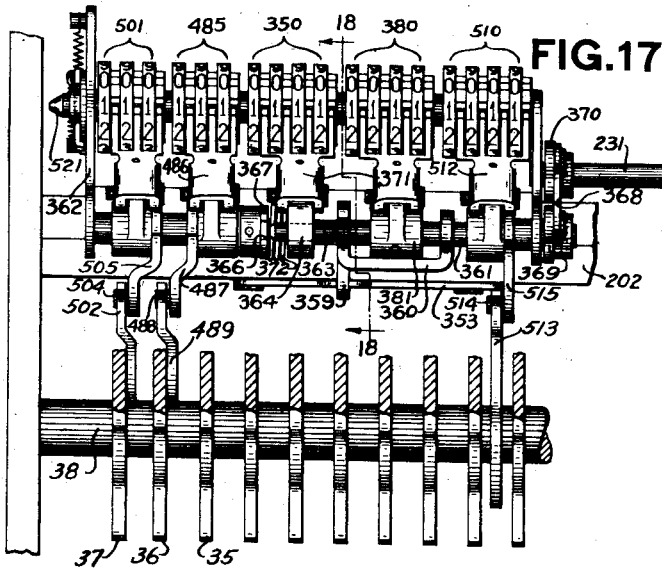
Fig. 17 is a detail elevational view of the special counters.
Figure 18:
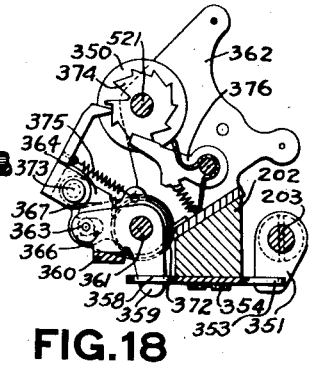
Fig. 18 is a section taken on line 18—18 of Fig. 17, showing the "Charge" counter.

The carrying pawl 512 of this counter is actuated by a lever 513 fulcrumed on the key shaft 38 (Figs. 3 and 17). The forward end of this lever is bifurcated to cooperate with a pin 514 projecting laterally from a carrying pawl lever 515. The rear end 516 hooks over the lip 403 of the key coupler.

Figure 20:
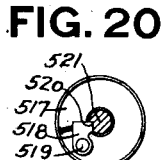
Fig. 20 is a detail elevational view of one of the special counter wheels showing the turn-to-zero pawl.

All of the special counters are turned to zero by a common means. Each counter wheel 517 (Fig. 20) has a spring actuated pawl 518 freely mounted on a stud 519 and cooperating with a spline 520 in a turn back shaft 521. As the shaft is turned in a counter-clockwise direction the spline will engage the pawls and move the wheels to the normal or zero positions.

Fastened to the left hand end of the counter turn back shaft is a disk 522 (Fig. 19) provided with a slot 523 in its hub to co-operate with any suitable turn back key. Freely mounted on a screw stud 524 is a spring actuated pawl 525, the right hand end of which engages a notch 526 formed in the disk 522. Also mounted on this screw stud is a stop lever 527 with a laterally projecting ear 528 engaging the lower edge of the pawl 525 and held in normal position by a spring 529. The upper end 530 of the lever 527 is bifurcated to engage a pin 531 projecting laterally from the disk 522. As the disk rotates, the pawl will move in a clockwise direction moving the upper end of the lever 527 into the plane of the pin 526 and stop the rotation of the shaft 521, after which a slight retrograde motion of this shaft will allow the lever 527 to return to normal position.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. In a machine of the class described, the combination of a grand totalizer, a recording totalizer, item entering means adapted to enter items on both of said totalizers simultaneously, disabling means operable at will in conjunction with said item entering means for preventing an entry of items on the grand totalizer, while permitting an entry of items on the recording totalizer, and means automatically operable upon operation of said item entering means to prevent an operation of said disabling means after an operation of said item entering means.

2. In a machine of the class described, the combination of a grand totalizer, a recording totalizer, item entering means adapted to enter items on both of said totalizers simultaneously, disabling means operable at will in conjunction with said item entering means for preventing the entry of items in the grand totalizer, total printing means operable in conjunction with said recording totalizer, and means automatically operable upon operation of said item entering means to prevent an operation of said disabling means, after an operation of said item entering means, and prior to an operation of said total printing means.

3. In a machine of the class described, the combination of a totalizer, item entering means adapted to enter items on said totalizer, disabling means for preventing the entry of items on said totalizer, a latch member automatically operable upon operation of said item entering means to prevent the operation of said disabling means after the completion of an operation of said item entering means, an ear formed on said latch, and means including a notched member to engage said ear to hold said latch in latching position.

4. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer, total printing means operable in conjunction with said recording totalizer, spring operated indicating means normally inoperable and made operable by the operation of said disabling means in conjunction with said item entering means, and means operated by said total printing means to release said indicating means to cause said indicating means return to normal position.

5. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer while permitting the entry of items on the recording totalizer, total printing means operable in conjunction with said recording totalizer, a counting means normally inoperable and made operable by the operation of said disabling means, and means operating in conjunction with said total printing means for operating said counting means.

6. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer, total printing means operable in conjunction with said recording totalizer, retaining means for holding said disabling means in its operated position, and releasing means operated by said total printing means allowing said disabling means to return to normal position.

7. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer, total printing means operable in conjunction with said recording totalizer, printer driving means normally inoperable, manipulative means controlling said driving means, and means for making said manipulative means inoperable when said disabling means is in a position intermediate its normal and operated positions.

8. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer while permitting the entry of items on the recording totalizer, a second disabling means having an initial movement prior to the operation of said item entering means, means for continuing the movement of said second disabling means in conjunction with said item entering means, and means for disabling said first disabling means by the initial movement of said second disabling means.

9. In a machine of the class described, the combination of a grand totalizer, a recording totalizer, item entering means adapted to enter items on both of said totalizers simultaneously, a disabling means having an initial movement prior to the operation of said item entering means for preventing the entry of items on the grand totalizer while permitting the entry of items on the recording totalizer, means for continuing the movement of said disabling means in conjunction with said item entering means, total printing means operable in conjunction with said recording totalizer, and means operable in conjunction with said disabling means for preventing a second operation of said item entering means prior to an operation of said total printing means.

10. In a machine of the class described, the combination of a grand totalizer, a recording totalizer, item entering means adapted to enter items on both of said totalizers simultaneously, total printing means operable in conjunction with said recording totalizer, manipulative means having an initial movement, means for continuing the movement of said manipulative means in conjunction with said item entering means, and means preventing a second operation of said manipulative means until after the operation of said total printing means.

11. In a machine of the class described, the combination of a grand totalizer, a recording totalizer, item entering means adapted to enter items on both of said totalizers simultaneously, disabling means operable at will in conjunction with said item entering means for preventing the entry of items on the grand totalizer, manipulative means having an initial movement, means for continuing the operation of said manipulative means in conjunction with said item entering means, and means for making said disabling means inoperable when said manipulative means is operated.

12. In a machine of the class described, a totalizer, item entering means adapted to enter items on said totalizer, a transaction type printing wheel, a transaction key adapted upon movement from home position, to position said transaction type printing wheel, a total printing device, and means for retaining said transaction type printing wheel in operated position until released by the total printing device.

13. In a machine of the class described, a totalizer, item entering means adapted to enter items on said totalizer, total printing means operable in conjunction with said totalizer, a transaction type printing wheel, a transaction key adapted to position said transaction type printing wheel, means for retaining said transaction type printing wheel in operated position while said transaction key is returned to normal position, and means controlled by said total printing means for returning said transaction type printing wheel to normal position during the operation of said total printing means.

14. In a machine of the class described, a press down lever key, a lateral projection thereon, a rod, an arm fastened on said rod and adapted to move into the path of said projection, a sliding push key, and means intermediate said push key and said rod for rocking said rod for moving said arm into the path of said key projection to prevent operation of said lever key.

15. In a machine of the class described, a press down lever key, a lateral projection thereon, a rod, an arm fastened thereon and adapted to move into the path of said key projection, a sliding push key, and means secured to said rod for preventing the operation of said push key when said lever key is operated.

16. The combination of an item printing mechanism, a total printing mechanism involving type for printing characters indicative of the transaction involved, means for adjusting said type prior to an item printing operation, and means for preventing a resetting of said type between an item printing operation and a total printing operation.

17. The combination of item printing elements, means for adjusting the same, a total printing mechanism involving type for printing characters indicative of the transaction involved, means for adjusting said type simultaneously with the adjustment of the item printing elements, and means for preventing a resetting of said type between an item printing operation and a total printing operation.

18. The combination of an item entering means, a total taking means involving an adjustable type carrier for printing characters denoting transactions, means for counting the number of items in a transaction, means for selecting a counting means, and means for preventing an adjustment of said type carrier and a selection of a counting means between an item entering operation and a total taking operation.

19. In a machine of the class described, the combination of an item entering means, a total recording means, means for counting the number of items involved in each of a series of different kinds of transactions, means for selecting the appropriate counting means in connection with an item entering operation, and means for preventing a selection of other counting means prior to a total recording operation.

20. The combination of an item entering means, a total recording mechanism, a plurality of transaction keys, a plurality of transaction counters adapted to be selected by their respective keys, and means actuated by the transaction keys for preventing a second operation of said item entering means and transaction keys prior to a total recording operation.

21. The combination of item entering means, means for printing the total of items, means operable prior to an item entering operation for indicating the nature of the transaction involved as the items are entered and the total is printed, means for preventing an adjustment of said indicating means during item entering and total printing operations, and means operable upon an operation of the total printing mechanism for releasing said indicating means.

22. The combination of an item entering mechanism, printing mechanism for printing totals of items involving a transaction type carrier, means for adjusting said transaction type carrier during entry of the first item of a transaction, means to maintain the transaction type carrier in the adjusted position, and means operable only during total-taking operations to release the transaction type carrier.

23. In a machine including item entering means and a total printing mechanism, the combination of means for indicating the kind of transaction in which a series of items and their total are involved, means for operating said indicating means simultaneously with the entry of the first item of the transaction, and means to maintain the indicator in the operated position until after the total is printed, thus preventing a change of the indicator during the series of item entering operations after the first item has been entered.

24. In a machine of the class described, the combination of a totalizer, item entering means, means for preventing the entry of items in said totalizer, and means automatically operable upon operation of said item entering means to prevent the operation of said preventing means after a completion of an operation of said item entering means.

25. In a machine of the class described, the combination of a grand totalizer, a recording totalizer, item entering means adapted to enter items on both of said totalizers simultaneously, disabling means operable at will in conjunction with said item entering means for preventing the entry of items in the grand totalizer, a total printing means operable in conjunction with said recording totalizer, and means preventing a second operation of said disabling means, after an operation of said item entering means, and prior to an operation of said total printing means.

26. In a machine of the class described, the combination of a total printing mechanism, an item key, a key coupler operated by said item key, an arm attached to and operated by said key coupler, a paid out key, a cam plate operated by said paid out key, a rod rocked by said plate, a retaining means for said rod, a lever secured to said rod, and a member cooperating with said lever to engage said key coupler arm after an operation of said item key and said paid out key to prevent an operation of a second item key prior to the operation of said total printing mechanism.

27. In a machine of the class described, the combination of a total printing mechanism, an item key, a pivoted member operated by said item key, a transaction key, and means controlled by said transaction key, and cooperating with said pivoted member to prevent a second operation of said item key prior to an operation of said printing mechanism.

28. In a machine of the class described, the combination of a total printing mechanism, an item key, a pivoted member operated by said item key, a transaction key, a pivoted means operated by said transaction key, means retaining said pivoted means in operated position, and means cooperating with said pivoted means to engage said pivoted member and prevent a second operation of said item key prior to an operation of said printing mechanism.

29. In a machine of the class described, the combination of a total printing mechanism, a lever item key, a lever transaction key, and means preventing a second operation of said lever item key after the operation of said item key and transaction key, and prior to an operation of said printing mechanism.

30. In a machine of the class described, the combination of a total printing mechanism, item entering means, a transaction key operating in conjunction with said item entering means, and means preventing a second operation of said item entering means and said key prior to the operation of said total printing mechanism.

31. In a machine of the class described, the combination of a total printing mechanism, item entering means, and means preventing a second operation of said item entering means prior to an operation of said printing mechanism.

32. In a machine of the class described, the combination of a total printing mechanism, item entering means adapted to enter a single item or a plurality of items, and means preventing a second operation of said item entering means in a single item operation, and prior to an operation of said printing mechanism.

33. In a machine of the class described; item entering means; a plurality of printing units adapted to record a series of items entered in the machine and the totals thereof on one record medium, and to record only the totals of said series of items upon another record medium; special character printing means adapted to be set during the entry of the first item; means for holding said special character printing means in set position during succeeding item entering operations; means for printing from said special character printing means only when totals are printed; and means for releasing the special character printing means upon the printing of a total.

34. In a machine of the class described, item entering devices including special character controlling means, a printing unit adapted to record a series of items entered in the machine and the totals thereof, said unit including a special character printing element under control of said controlling means, means for adjusting said element during the first item entering operation, and means for printing from said element only when a total is printed.

In testimony whereof we affix our signatures.

EDWARD J. VON PEIN.
WILLIAM S. ROUX.